(12) United States Patent
Tanaka et al.

(10) Patent No.: US 10,429,506 B2
(45) Date of Patent: Oct. 1, 2019

(54) LATERAL DISTANCE SENSOR DIAGNOSIS APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hidenori Tanaka, Kariya (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 330 days.

(21) Appl. No.: 15/519,807

(22) PCT Filed: Oct. 21, 2015

(86) PCT No.: PCT/JP2015/005305
§ 371 (c)(1),
(2) Date: Apr. 17, 2017

(87) PCT Pub. No.: WO2016/063534
PCT Pub. Date: Apr. 28, 2016

(65) Prior Publication Data
US 2017/0242121 A1 Aug. 24, 2017

(30) Foreign Application Priority Data

Oct. 22, 2014 (JP) .................................. 2014-215716

(51) Int. Cl.
*G01S 15/00* (2006.01)
*G01S 15/93* (2006.01)
(Continued)

(52) U.S. Cl.
CPC .............. *G01S 15/931* (2013.01); *G01S 7/40* (2013.01); *G01S 7/497* (2013.01);
(Continued)

(58) Field of Classification Search
None
See application file for complete search history.

(56) References Cited

U.S. PATENT DOCUMENTS 5,343,206 A * 8/1994 Ansaldi .................. G01S 13/931
342/179
5,375,059 A * 12/1994 Kyrtsos .............. B60K 31/0008
342/357.24
(Continued)

FOREIGN PATENT DOCUMENTS

JP   2003-114276 A    4/2003
JP   2009-234296 A   10/2009
(Continued)

OTHER PUBLICATIONS

Tan, Han-Shue, et al. Fault Diagnosis and Safety Design of Automated Steering Controller and Electronic Control Unit (ECU) for Steering Actuator. No. UCB-ITS-PRR-2005-27. 2005. (Year: 2005).*

*Primary Examiner* — Isam A Alsomiri
*Assistant Examiner* — Jonathan D Armstrong
(74) *Attorney, Agent, or Firm* — Knobbe, Martens, Olson & Bear, LLP

(57) ABSTRACT

A lateral distance sensor diagnosis apparatus cooperating with a lateral distance sensor in a vehicle includes a travel enabled distance acquisition section and a diagnosis test section. The travel enabled distance acquisition section determines whether the vehicle is estimated to have contact with an object detected by the lateral distance sensor, based on a distance detected by the lateral distance sensor and a present steering angle. When determining that the vehicle is estimated to have contact with the detected object, the travel (Continued)

enabled distance acquisition section acquires a travel enabled distance based on a distance detected by the lateral distance sensor. The diagnosis test section determines that the lateral distance sensor fails to operate normally when a movement distance becomes greater than the travel enabled distance under state where the steering angle is an angle causing the vehicle to have contact with an object detected by the lateral distance sensor.

8 Claims, 4 Drawing Sheets

(51) Int. Cl.
| | |
|---|---|
| G01S 7/40 | (2006.01) |
| G01S 7/497 | (2006.01) |
| G01S 7/52 | (2006.01) |
| G01S 13/08 | (2006.01) |
| G01S 13/93 | (2006.01) |
| G01S 15/08 | (2006.01) |
| G01S 17/08 | (2006.01) |
| G01S 17/93 | (2006.01) |

(52) U.S. Cl.
CPC .......... *G01S 7/52004* (2013.01); *G01S 13/08* (2013.01); *G01S 13/931* (2013.01); *G01S 15/08* (2013.01); *G01S 17/08* (2013.01); *G01S 17/936* (2013.01); *G01S 2013/9332* (2013.01); *G01S 2013/9364* (2013.01); *G01S 2013/9367* (2013.01); *G01S 2013/9385* (2013.01); *G01S 2015/937* (2013.01)

(56) References Cited

U.S. PATENT DOCUMENTS

| | | | | |
|---|---|---|---|---|
| 5,388,048 A * | 2/1995 | Yavnayi | ................. | G01S 17/936 180/169 |
| 5,572,428 A * | 11/1996 | Ishida | ................. | B60K 31/0008 180/169 |
| 5,612,883 A * | 3/1997 | Shaffer | .............. | B60K 31/0008 340/435 |
| 6,169,572 B1 * | 1/2001 | Sogawa | ................. | G01S 3/7864 348/113 |
| 6,292,725 B1 * | 9/2001 | Kageyama | ............. | G05D 1/027 180/169 |
| 2001/0054956 A1 * | 12/2001 | Ichikawa | .................. | B60T 7/22 340/436 |
| 2002/0105416 A1 * | 8/2002 | Kore | .................... | B60R 21/013 340/425.5 |
| 2002/0128750 A1 * | 9/2002 | Kakinami | .............. | B60Q 9/005 701/1 |
| 2002/0165646 A1 * | 11/2002 | Bohr | ...................... | B62D 6/005 701/1 |
| 2003/0179129 A1 * | 9/2003 | Tamatsu | .................. | G01S 7/354 342/70 |
| 2005/0004761 A1 * | 1/2005 | Takahama | ............. | G01S 17/023 701/301 |
| 2005/0203705 A1 * | 9/2005 | Izumi | ........................ | B60T 7/22 701/301 |
| 2006/0271296 A1 * | 11/2006 | Takeichi | ............. | G01S 7/52004 701/300 |
| 2007/0239358 A1 * | 10/2007 | Okazaki | .............. | B60R 21/0134 701/301 |
| 2008/0088424 A1 * | 4/2008 | Imura | ................. | B60W 30/095 340/436 |
| 2009/0299633 A1 * | 12/2009 | Hawes | ................ | B60R 21/0134 701/300 |
| 2010/0141413 A1 * | 6/2010 | Suzuki | .................... | G01S 13/87 340/435 |
| 2012/0170808 A1 * | 7/2012 | Ogata | ................. | B60R 21/0134 382/103 |
| 2014/0200799 A1 * | 7/2014 | Sugano | ................ | B62D 15/027 701/301 |
| 2014/0347207 A1 * | 11/2014 | Zeng | ........................ | G01S 13/87 342/71 |
| 2015/0175167 A1 * | 6/2015 | Sakima | ............... | B60W 40/072 702/157 |
| 2016/0003943 A1 * | 1/2016 | Nakano | .................. | G08G 1/166 701/301 |
| 2018/0178841 A1 * | 6/2018 | Ikedo | ..................... | G01S 13/931 |
| 2018/0257644 A1 * | 9/2018 | Morotomi | ............ | B60W 30/09 |
| 2018/0268699 A1 * | 9/2018 | Ohsawa | ................ | G08G 1/166 |
| 2019/0122556 A1 * | 4/2019 | Thapani | ................. | G08G 1/167 |

FOREIGN PATENT DOCUMENTS

| | | |
|---|---|---|
| JP | 2013-020458 A | 1/2013 |
| WO | 2016/063532 A1 | 4/2016 |
| WO | 2016/063535 A1 | 4/2016 |

* cited by examiner

| DETECTION DISTANCE [cm] | LOWER LIMIT STEERING ANGLE [DEGREE] | TRAVEL ENABLED DISTANCE [m] |
|---|---|---|
| 55 – 60 | $\theta 1$ | Dc1 |
| 50 – 55 | $\theta 2$ | Dc2 |
| 45 – 50 | $\theta 3$ | Dc3 |
| 40 – 45 | $\theta 4$ | Dc4 |
| 35 – 40 | $\theta 5$ | Dc5 |
| < 35 | $\theta 6$ | Dc6 |

FIG. 6

| INPUT STEERING ANGLE [DEGREE] | DETECTION DISTANCE [cm] | | | | | |
|---|---|---|---|---|---|---|
| | < 35 | 35 - 40 | 40 - 45 | 45 - 50 | 50 - 55 | 55 - 60 |
| 20 - 25 | ... | ... | ... | ... | | |
| 25 - 30 | ... | Dc22 | ... | ... | ... | |
| 30 - 35 | ... | ... | ... | ... | ... | ... |
| 35 - 40 | ... | ... | ... | ... | ... | ... |
| ... | ... | ... | ... | ... | ... | ... |

LATERAL DISTANCE SENSOR DIAGNOSIS APPARATUS

CROSS REFERENCE TO RELATED APPLICATION

The present application is based on Japanese Patent Application No. 2014-215716 filed on Oct. 22, 2014, the disclosure of which is incorporated herein by reference.

TECHNICAL FIELD

The present disclosure relates to a lateral distance sensor diagnosis apparatus.

BACKGROUND ART

There is conventionally proposed an apparatus using a lateral distance sensor that transmits search waves towards a lateral region relative to the vehicle mounted with the apparatus and receives reflected waves reflected by an object existing in a propagation range of the search waves, thereby detecting a distance to the object existing in the lateral region.

For instance, Patent literature 1 discloses an apparatus that detects an obstacle using a lateral distance sensor, stores a relative position of the detected obstacle against the vehicle, and issues an alarm when the distance between the vehicle and the relative position of the obstacle is equal to or less than a predetermined distance.

PRIOR ART LITERATURES

Patent Literature

Patent literature 1: JP 2003-114276 A

SUMMARY OF INVENTION

The lateral distance sensor has a sensor surface that transmits search waves and receives reflected waves; foreign material such as snow or mud may be attached to the sensor surface. Such attached material may cause the lateral distance sensor to detect an obstacle which does not exist in fact.

The lateral distance sensor having detected mistakenly an obstacle which does not exist may issue an alarm so as to teach an existence of an obstacle, possibly giving an occupant of the vehicle a sense of incongruity or discomfort.

It is an object of the present disclosure to provide a lateral distance sensor diagnosis apparatus that can detect that a lateral distance sensor does not operate normally.

According to an example of the present disclosure, a lateral distance sensor diagnosis apparatus cooperates with a lateral distance sensor that detects a distance with an object existing in a lateral region relative to a vehicle by transmitting search waves towards the lateral region and receiving reflected waves reflected by the object in a propagation range of the search waves. The lateral distance sensor diagnosis apparatus includes a detection result acquisition section, a vehicle information acquisition section, a travel enabled distance acquisition section, a movement distance calculation section, and a diagnosis test section. The detection result acquisition section acquires a detection distance that is a distance detected by the lateral distance sensor. The vehicle information acquisition section acquires vehicle information that is information indicating a travel state of the vehicle, the vehicle information including a steering angle. The travel enabled distance acquisition section determines whether the vehicle is estimated to have contact with the object detected by the lateral distance sensor because of a turning radius difference between tracks followed by front and rear inner wheels when turning based on the detection distance acquired by the detection result acquisition section and the steering angle included in the vehicle information. The travel enabled distance acquisition section acquires, based on the detection distance, a travel enabled distance when determining that the vehicle is estimated to have contact with the object; the travel enabled distance is a distance the vehicle is permitted to travel before the vehicle has contact with the object. The movement distance calculation section calculates a movement distance of the vehicle from when the detection result acquisition section acquires the detection distance that the travel enabled distance acquisition section uses to acquire the travel enabled distance. The diagnosis test section determines whether the lateral distance sensor operates normally by comparing, when the travel enabled distance acquisition section determines that the vehicle is estimated to have contact with the object, the movement distance calculated by the movement distance calculation section with the travel enabled distance acquired by the travel enabled distance acquisition section. Herein the diagnosis test section determines that the lateral distance sensor fails to operate normally when the movement distance becomes greater than the travel enabled distance under a state being maintained, the state where the steering angle accords with an angle at which the vehicle will have contact with the object.

Under the above configuration, the diagnosis test section determines that the lateral distance sensor does not operate normally when the movement distance of the vehicle becomes equal to or greater than the travel enabled distance under the continued state where the steering angle is maintained at the angle causing the vehicle to have contact with the object detected with the lateral distance sensor.

Assume that the lateral distance sensor detects a distance with an obstacle which actually exists. In such assumption, if the vehicle travels the travel enabled distance under the continued state where the steering angle is maintained at the angle causing the vehicle to have contact with the object detected with the lateral distance sensor, the vehicle will have contact with the obstacle. That is, the vehicle cannot travel actually the travel enabled distance or greater under the continued state where the steering angle is maintained at the angle causing the vehicle to have contact with the object detected by the lateral distance sensor.

In other words, suppose a case that the vehicle can travel actually the travel enabled distance under the continued state where the steering angle is maintained at the angle causing the vehicle to have contact with the object detected with the lateral distance sensor. Such a case signifies that the object detected by the lateral distance sensor is an object that does not exist actually. That is, the case that the vehicle can travel actually the travel enabled distance under the continued state where the steering angle is maintained at the angle causing the vehicle to have contact with the object detected by the lateral distance sensor signifies that the lateral distance sensor does not operate normally.

The above-mentioned configuration can therefore detect that the lateral distance sensor does not operate normally.

BRIEF DESCRIPTION OF DRAWINGS

The above and other objects, features and advantages of the present disclosure will become more apparent from the following detailed description made with reference to the accompanying drawings. In the drawings:

FIG. 6 is an example of correspondence relation data according to a first modification.

EMBODIMENTS FOR CARRYING OUT INVENTION

Figure 1:
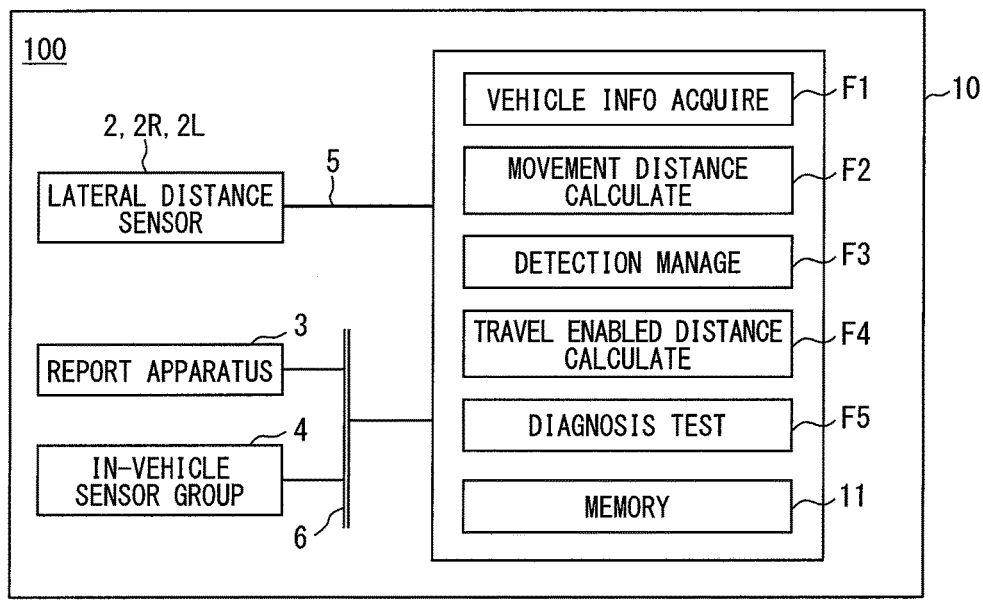
FIG. 1 is a block diagram illustrating a brief configuration of a sensor diagnosis system according to an embodiment.

The following will explain an embodiment of the present disclosure with reference to drawings. FIG. 1 is a block diagram illustrating an example of a brief configuration of a sensor diagnosis system 100 according to the present embodiment. The sensor diagnosis system 100 includes a diagnosis apparatus 1, a lateral distance sensor 2, a report apparatus 3, and an in-vehicle sensor group 4 in a vehicle 10, as in FIG. 1.

The diagnosis apparatus 1 and the lateral distance sensor 2 communicate with each other via a LIN bus 5. In addition, the diagnosis apparatus 1 communicates with the report apparatus 3 or the in-vehicle sensor group 4 via an in-vehicle LAN 6.

The lateral distance sensor 2 is mounted in the vehicle 10, and detects an object (i.e., an obstacle) which exists in a left lateral region or a right lateral region relative to the vehicle 10. The lateral distance sensor 2 can use a milliwave radar, a laser radar, a sonar, etc., or any combination of the foregoing. Note that the vehicle 10 mounted with the above may be also referred to as a host vehicle.

In the present embodiment, the lateral distance sensor 2 includes a right-front lateral sonar 2R arranged at a right side face of a front bumper of the vehicle 10, and a left-front lateral sonar 2L arranged at a left side face of the front bumper of the vehicle 10. The lateral sonars 2R and 2L each are a well-known sonar, which transmits search waves and receives reflected waves reflected by an obstacle existing in a propagation range of the search waves, thereby performing a detection of the obstacle and a detection of a distance with the obstacle.

For example, the lateral sonars 2R and 2L may be each installed in a side face of the front bumper to have a position such that a center line of directionality is parallel with an axle direction of the vehicle 10. The lateral sonars 2R and 2L each transmit search waves towards a lateral region relative to the vehicle 10, thereby forming a predetermined detection range from the installed position to a front lateral region relative to the vehicle 10. The detection range is a range where a lateral sonar is permitted to detect an obstacle. The distance where the lateral sonars 2R and 2L each can detect an obstacle is about 2 m in the center line in directionality.

The central line in the directionality of each lateral sonar 2R and 2L may extend to incline forward up to about 40 degrees with respect to the axle direction of the vehicle 10. In this case, each lateral sonar 2R and 2L transmits search waves diagonally forward right and left of the vehicle 10, respectively. Hereinafter, when not distinguishing the right-front lateral sonar 2R and the left-front lateral sonar 2L from each other or when indicating commonly the both, each is referred to as a lateral distance sensor 2.

The lateral distance sensor 2 provides a detection result data indicating a distance Dx (hereinafter, detection distance) with an obstacle to the diagnosis apparatus 1. The detection distance Dx is specified by transmitting and receiving search waves. Note that the detection distance Dx indicates precisely a distance to a point of the obstacle nearest from the lateral distance sensor 2. Hereinafter, the position where the obstacle detected by the lateral distance sensor 2 is estimated to exist is called the detection point. The detection distance Dx indicates a distance from the lateral distance sensor 2 to the detection point.

In addition, the lateral distance sensor 2 transmits search waves periodically with predetermined sampling periods when the vehicle 10 runs at a vehicle speed within a predetermined operational speed range. The upper limit of the operational speed range may be 40 km/h or less; the lower limit may be a value greater than zero. In addition, the sampling period may be 100 milliseconds. The following refers to a series of processing by the lateral distance sensor 2 from when outputting transmission waves to when providing the diagnosis apparatus 1 with the detection result data as a detection process.

The report apparatus 3 performs a report for notifying the driver that the lateral distance sensor 2 fails to operate normally (i.e., malfunctions), based on an instruction from the diagnosis apparatus 1. The report apparatus 3 may be achieved using at least one of well-known display apparatus, speaker, and vibration generation apparatus (hereinafter, vibrator) generating vibration. For example, when the report apparatus 3 performs a report via the visual sense of the driver, an image or text may be illustrated in the display apparatus, the image or text indicating that the lateral distance sensor 2 malfunctions.

In addition, when the report apparatus 3 performs a report via the auditory sense of the driver, a predetermined alarm sound or a message indicating the above content may be audibly outputted. Furthermore, when the report apparatus 3 performs a report via the tactile sense of the driver, the vibrator may be vibrated in a predetermined vibration pattern. The vibrator may be installed in a position such as a driver's seat or steering wheel, which makes contact with the driver.

The in-vehicle sensor group 4 is a group of sensors for detecting various quantities of states indicating a travel state of the vehicle 10. The in-vehicle sensor group 4 includes a speed sensor, an acceleration sensor, a gyro sensor, a steering angle sensor, and a shift position sensor.

The speed sensor detects a travel speed of the vehicle 10; the acceleration sensor detects an acceleration which acts in a forth-and-back direction of the vehicle 10. The gyro sensor detects an angular rate of rotation about the vertical axis of the vehicle 10; the steering angle sensor detects a steering angle θ based on a turn angle of the steering wheel. The shift position sensor detects a position of the shift lever.

The sensors included in the in-vehicle sensor group 4 detect various quantities of states (i.e., vehicle information) and output them to the diagnosis apparatus 1 successively (e.g., every 100 milliseconds). Note that the in-vehicle sensor group 4 need not include all the sensors described above. In addition, a sensor included in the in-vehicle sensor group 4 is not limited to the sensors exemplified above. The in-vehicle sensor group 4 just needs to include a sensor that detects a quantity of state used for the diagnosis apparatus 1 to calculate the variation of the position of the vehicle 10. The quantity of state used for calculating the variation of the position of the vehicle 10 corresponds to quantities of states such as a vehicle speed, a rotation amount of a wheel (angle of rotation), an acceleration, a steering angle θ, and an angular rate of rotation detected by a gyro sensor. Note that "information" may be used not only as an uncountable noun but also a countable noun.

The diagnosis apparatus 1 includes an electronic control unit (also referred to as an electronic control circuit). In the present embodiment, for instance, the electronic control unit is a well-known circuit configuration including (i) a microcomputer containing CPU, ROM, RAM, input/output interfaces, and (ii) a memory. The memory 11 may be provided to be separate from the electronic control unit. The CPU executing a program stored in the ROM or memory 11 permits the electronic control unit of the diagnosis apparatus 1 to function as a vehicle information acquisition section F1, a movement distance calculation section F2, a detection management section F3, a travel enabled distance acquisition section F4, and a diagnosis test section F5. All or part of the functions executed by the electronic control unit may be configured as hardware components such as one or more ICs. In addition, the above sections each may be also referred to as a device or a module. The diagnosis apparatus 1 functions as a lateral distance sensor diagnosis apparatus.

The memory 11 may use a well-known nonvolatile storage media. The memory 11 may more desirably contain both of a storage area that is nonvolatile and rewritable and a storage area that is volatile and rewritable.

The nonvolatile storage area of the memory 11 stores vehicle-body shape information and correspondence relation data. The vehicle-body shape information indicates a shape of a vehicle body of the vehicle 10, such as a vehicle height, a vehicle width, a vehicle length in forth-and-back direction. The vehicle-body shape information further contains positions of respective parts of the vehicle body relative to a reference point of the vehicle 10, and installation positions of in-vehicle apparatuses such as the respective wheels, and the lateral distance sensor 2. That is, the vehicle-body shape information contains a distance and a direction from the reference point with respect to a front end, a lateral side end, and a corner of the vehicle 10.

The reference point of the vehicle 10, which may be designated as needed, is designated, for instance in the embodiment, as a position corresponding to a vehicle-width center of a rear wheel axle. The reference point may be alternatively designated as a point that has an identical distance from each of the front end and the rear end of the vehicle 10 on a center line having identical distance from each of both the side faces of the vehicle 10.

The vehicle information acquisition section F1 acquires vehicle information from the in-vehicle sensor group 4; the acquired vehicle information is then attached with time stamp indicating the time of being acquired and stored in the memory 11. Each vehicle information acquired at each of corresponding times may be stored in the memory in order of time series. The memory 11 is enabled to be referenced from the functional sections; the respective functional sections can execute processes by using the vehicle information in the memory 11, as needed.

The movement distance calculation section F2 calculates a movement distance Da of the vehicle 10 from the time of being instructed by the diagnosis test section F5 (to be explained later) to the present time, based on the vehicle information inputted successively from the in-vehicle sensor group 4. How to calculate the movement distance Da of the vehicle 10 based on the vehicle information may use a well-known technique.

For instance, the movement distance calculation section F2 successively calculates a unit movement distance for a calculation cycle, i.e., the movement distance of the vehicle 10 for a fixed time from the vehicle speed and acceleration included in the vehicle information. More specifically, the unit movement distance is calculated by adding on a first value to a second value. The first value is obtained by multiplying an acceleration by the square of the calculation cycle and then dividing it by two; the second value is obtained by multiplying the calculation cycle by the velocity in the vehicle information. The calculation cycle may be an acquisition time interval of acquiring the vehicle information. The movement distance Da from a certain time (i.e., a calculation start time) to the present time can be found by adding a plurality of unit movement distances found for the respective calculation cycles from the calculation start time.

Further, the movement distance calculation section F2 calculates a variation in the vehicle position of the vehicle 10 from a certain time to the present time, based on the vehicle information inputted successively from the in-vehicle sensor group 4. The variation in the vehicle position of the vehicle 10 contains a movement distance, a movement direction, and an angle (varied angle) of a variation in the orientation of the vehicle body. How to specify the variation in the vehicle information based on the vehicle information may use a well-known technique.

The movement distance calculation section F2 may calculate the varied angle, the movement direction, and the movement distance in the period for calculating the variation based on the vehicle speed, acceleration, and angular rate of rotation in the vehicle information, each time acquiring the vehicle information. The vehicle position may correspond to the position of the reference point in the vehicle 10.

The detection management section F3, which may be referred to as a detection result management section F3, acquires detection result data from the lateral distance sensor 2 successively. In addition, the acquired detection result data may be stored in the memory 11 to be associated with the corresponding lateral sonars that output the respective detection result data and the acquired order in time series. For example, the detection management section F3 may store the detection result data in the memory 11 in the state where the detection result data are stored to be attached with time stamps and listed in the order of time series. That is, the memory 11 stores the data listing the detection results of the right-front lateral sonar 2R in the order of time series and the data listing the detection results of the left-front lateral sonar 2L in the order of time series. Note that the detection result of the lateral distance sensor 2 corresponds to the detection distance Dx from the lateral distance sensor 2 to the detection point. The detection management section F3 may be also referred to as a detection result acquisition section.

The travel enabled distance acquisition section F4 acquires a travel enabled distance Dc and a lower limit of a steering angle θ. The travel enabled distance Dc is a distance the vehicle 10 is permitted to travel before getting contact with an obstacle detected by the lateral distance sensor 2 with a turning radius difference between tracks followed by front and rear inner wheels at the time when the vehicle 10 turns. The lower limit of the steering angle θ is a steering angle that causes the contact. The above detection distance Dx corresponds to the detection distance Dx by the lateral distance sensor 2 having a detection range in the direction in which the vehicle 10 turns. For example, when the vehicle 10 turns to the right, the detection distance Dx by the right-front lateral sonar 2R is used.

Figure 2:
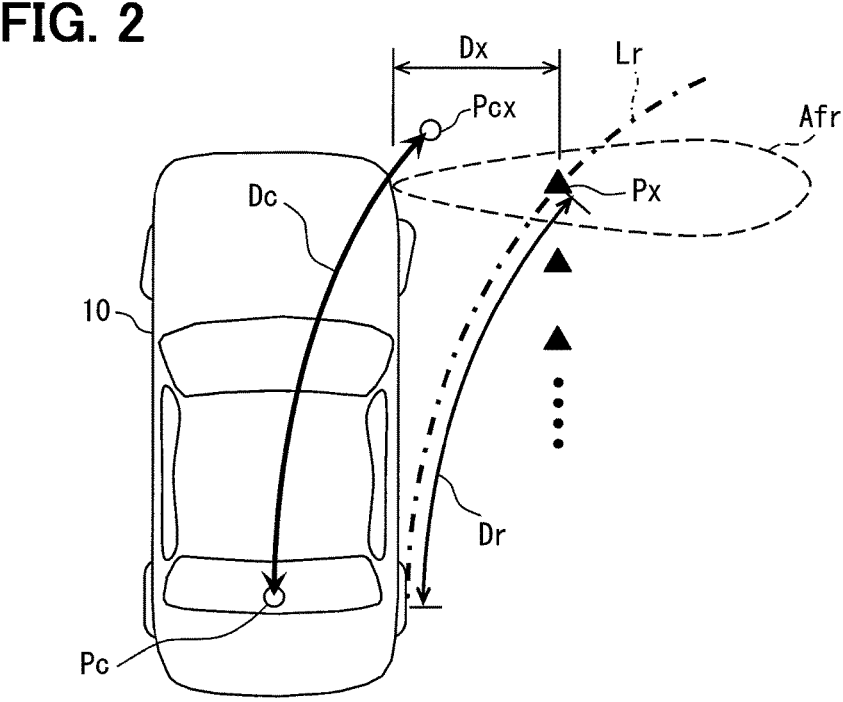
FIG. 2 is a diagram schematically illustrating a positional relation between a vehicle and a detection point detected by a lateral distance sensor.

The concept of the travel enabled distance Dc is explained using FIG. 2. FIG. 2 illustrates a positional relation between the vehicle 10 and the detection point that is detected by the right-front lateral sonar 2R. The range assigned with sign Afr indicates an example of a detection range by the right-front lateral sonar 2R; the black triangle mark assigned with sign Px is a detection point obtained with a newest detection process. Other black triangle marks are detection points corresponding to the detection distances Dx acquired previously by the detection process. The position assigned with sign Pc is a reference point of the vehicle 10.

Note that, for convenience, the right-front lateral sonar 2R is assumed to have a narrow directionality in the horizontal plane, and th detection point Px is assumed to be positioned at a point in the center direction of the directionality distant from the lateral distance sensor 2 by the detection distance Dx.

Suppose that the positional relation between the vehicle 10 and the detection point Px is present as in FIG. 2. When the steering angle θ is given in the direction of the right turn, the vehicle 10 turns to the right depending on the steering angle G. When the steering angle θ greater than a predetermined angle is inputted by the driver at this time, the vehicle 10 travels on the detection point Px due to the turning radius difference between tracks followed by the front right wheel and the rear right wheel inner when turning. That is, the vehicle 10 travels as involving the detection point Px.

The lower limit of the steering angle at which the vehicle 10 travels on the detection point Px due to the turning radius difference between tracks followed by front and rear inner wheels when turning is defined as an angle at which the movement locus Lr of the rear right wheel of the vehicle 10 passes through the detection point Px. The angle is referred to as a lower limit steering angle θth. The lower limit steering angle θth is specified based on the detection distance Dx and the distance from the rear right wheel to the right-front lateral sonar 2R.

Suppose that an obstacle actually exists in the position of the detection point Px. If the steering angle θ equal to or greater than the lower limit steering angle θth is inputted, the vehicle 10 will have contact with the obstacle. The vehicle 10 is thus not permitted to travel any longer. The above-mentioned travel enabled distance Dc is defined as a distance that the vehicle is permitted to travel before being positioned on the detection point Px when the steering angle θ equal to the lower limit steering angle θth is inputted.

Further, an attached material such as snow or mud may be attached to a sensor part (e.g., microphone) of the lateral distance sensor 2. Such cases may cause an incorrect detection of the distance with an obstacle due to the search waves affected with the attached material. This may pose an incorrect detection that an obstacle exists at a position at which the obstacle does not exist in fact. If the detection point Px is obtained due to such incorrect detection, any obstacle does not exist in fact at the position corresponding to the detection point Px. The vehicle 10 is thus permitted to travel longer than the travel enabled distance Dc.

That is, the fact that the vehicle 10 has travelled equal to or greater than the travel enabled distance Dc signifies that the detection point Px is based on an incorrect detection. This results in signifying that the lateral distance sensor 2 malfunctions due to an attached material, etc.

Further, if the steering angle θ inputted is less than the lower limit steering angle θth, the vehicle 10 does not travel on the detection point Px. The travel enabled distance Dc cannot be thus defined if the steering angle θ is less than the lower limit steering angle θth.

In contrast, suppose that the steering angle greater than the lower limit steering angle θth is inputted. In this case, the vehicle 10 turns more steeply and thus comes to be positioned on the detection point Px after traveling a distance shorter than the distance in the case that the steering angle θ equal to the lower limit steering angle θth is inputted. That is, when an obstacle actually exists in the position of the detection point Px and, simultaneously, the steering angle equal to or greater than the lower limit steering angle is inputted, the vehicle 10 comes to have contact with the obstacle before traveling the travel enabled distance Dc.

In contrast, suppose that the vehicle is permitted to travel at least the travel enabled distance Dth under the state where the steering angle θ greater than the lower limit steering angle θth is inputted. Such case signifies that the detection point Px is due to an incorrect detection. The travel enabled distance Dc indicates the maximum distance the vehicle 10 is permitted to travel before having contact with the obstacle corresponding to the detection point Px.

The travel enabled distance Dc is, as in FIG. 2, a distance that the reference point Pc of the vehicle 10 moves before the rear right wheel becomes located on the detection point Px. The sign Pcx indicates the position of the reference point Pc when the rear right wheel has contact with Px. The movement distance Dr being a wheel movement distance of the rear right wheel until the rear right wheel is located on the detection point Px is specified based on the detection distance Dx and the distance from the rear right wheel to the right-front lateral sonar 2R.

The relative position of the reference point Pc of the vehicle position to the rear right wheel is constant; if the wheel movement distance Dr is specified uniquely, the travel enabled distance Dc is specified uniquely. That is, the travel enabled distance Dc is specified by the detection distance Dx, the distance from the rear right wheel to the right-front lateral sonar 2R, and the reference point of the vehicle position to the rear right wheel.

Herein, the distance from the rear right wheel to the right-front lateral sonar 2R and the relative position of the reference point Pc of the vehicle position to the rear right wheel each are a fixed value; the detection distance Dx is regarded as a parameter that varies the lower limit steering angle θth and the travel enabled distance Dc. The above explains a travel enabled distance with an example that the vehicle 10 turns to the right; the case of turning to the left is similarly explained.

In considering the above, the travel enabled distance acquisition section F4 acquires a lower limit steering angle θth and a travel enabled distance Dc according to a detection distance Dx. In the present embodiment, as in FIG. 3, the memory 11 stores correspondence relation data that is data indicating a correspondence relation among the detection distance Dx, the lower limit steering angle θth, and the travel enabled distance Dc. The travel enabled distance acquisition section F4 references the correspondence relation data, thereby acquiring the lower limit steering angle θth and the travel enabled distance Dc, which correspond to the detection distance Dx at the present time.

In the present embodiment, the correspondence relation data is data that indicates the correspondence relation between the lower limit steering angle θth and the travel enabled distance Dc, which correspond to the detection distance Dx up to a predetermined value. Herein, the detection distance as a target for the diagnosis related process is divided into several segments (i.e., detection distance segments); the lower limit steering angle θth and the travel enabled distance Dc are defined as data corresponding to each detection distance segment. Note that the notation "55-60" in FIG. 3 signifies a segment from a value equal to 55 cm to a value less than 60 cm. Other detection distance segments are similarly defined.

Figures 3, 4:
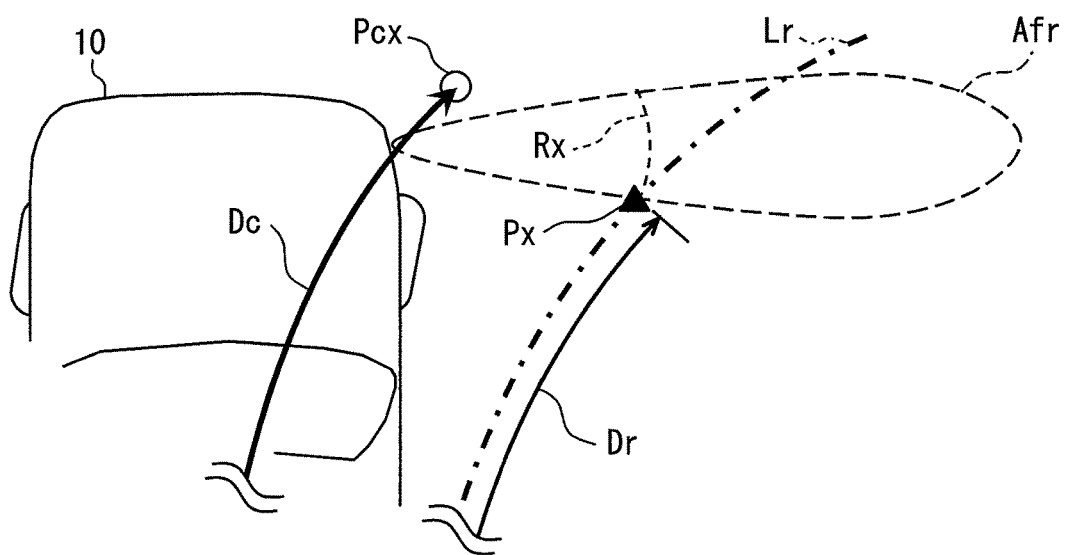
FIG. 3 is a diagram illustrating a relation among a detection distance, a lower limit steering angle, and a travel enabled distance.
FIG. 4 is a diagram schematically illustrating a positional relation between a vehicle and a detection point detected by a lateral distance sensor.

The correspondence relation data may be previously prepared by performing tests to specify the correspondence relation among the detection distance Dx, the lower limit steering angle θth, and the travel enabled distance Dc. Further, the correspondence relation data is more desirable to be prepared differently for each vehicle kind, or each vehicle model. Further, FIG. 3 illustrates an example of a table format indicating the correspondence relation among the detection distance Dx, the lower limit steering angle θth, and the travel enabled distance Dc; alternatively, the correspondence relation of the detection distance Dx, the lower limit steering angle θth, and the travel enabled distance Dc may be indicated using another format such as a function.

The travel enabled distance Dc acquired by the travel enabled distance acquisition section F4 is used by the process (hereinafter, diagnosis related process) for diagnosing whether the lateral distance sensor 2 operates normally. The correspondence relation data used for acquiring the travel enabled distance Dc is thus also the data used for the diagnosis related process mentioned later.

Incidentally, the inventors have conducted the various experiments, and obtained a knowledge that the detection distance Dx is relatively short when the lateral distance sensor 2 malfunctions due to attached material. Based on such knowledge, the present embodiment designates the upper limit of the detection distance Dx defined in the correspondence relation data to be a value (e.g., 60 cm) corresponding to the distance observed when the lateral distance sensor 2 malfunctions due to the attached material. That is, the range of the detection distance Dx defined in the correspondence relation data is designated based on the range of the distribution of the distance observed when the lateral distance sensor 2 malfunctions due to an attached material.

Suppose that the diagnosis related process using the above correspondence relation data determines that the lateral distance sensor 2 malfunctions. Such case thus indicates a high possibility that the lateral distance sensor 2 is attached with attached material. The correspondence relation data in the present embodiment mainly detects an incorrect operating state of the lateral distance sensor 2 due to an attached material.

The present embodiment sets the upper limit for diagnosis to be 60 cm; the upper limit for diagnosis is an upper limit of the detection distance Dx defined in the correspondence relation data. To prepare the correspondence relation data to meet the above purpose, the upper limit for diagnosis just needs to be set depending on the estimated value of the detection distance Dx observed when the lateral distance sensor 2 malfunctions due to an attached material.

In addition, the upper limit for diagnosis is desirably set to be a shorter than an estimated interval in the vehicle width direction between the vehicle 10 and a vehicle (i.e., a laterally peripheral vehicle) traveling parallel with the vehicle 10. Such configuration can help prevent the presence of a laterally peripheral vehicle from causing the diagnosis related process to mistakenly determine that the lateral distance sensor 2 malfunctions.

The estimated interval between the vehicle 10 and the laterally peripheral vehicle may be designated suitably based on (i) the width of a road where the vehicle 10 is estimated to travel, (ii) the vehicle width of the vehicle 10, etc. For instance, suppose that the vehicle width of the vehicle 10 and the vehicle width of a different vehicle different from the vehicle 10 each are 2 m while the width of one lane is 3 m. Such case sets the estimated interval between the vehicle 10 and the laterally peripheral vehicle to be 1 m. Similarly in the present embodiment, the upper limit for diagnosis is set to be a value smaller than the estimated interval (e.g., 1 m) between the vehicle 10 and the laterally peripheral vehicle in the vehicle width direction.

Alternatively, the correspondence relation data may define the lower limit steering angle θth or travel enabled distance Dc, which correspond to the detection distance Dx greater than the detection distance Dx observed when an attached material is attached to the lateral distance sensor 2. Further, the correspondence relation data may define the lower limit steering angle θth or travel enabled distance Dc, which correspond to the detection distance Dx greater than the estimated interval with the laterally peripheral vehicle. That is, the upper limit for diagnosis may be (i) a maximum of the detection distance Dx observed when the attached material is attached, or (ii) a value greater than the estimated interval with the laterally peripheral vehicle.

Further, the detection point Px is supposed to be located in the center direction of the directionality of the lateral distance sensor 2, for convenience, when explaining the concept of the travel enabled distance Dc. There is no need of being limited thereto. As in FIG. 4, the travel enabled distance Dc may be designated on assumption that the detection point Px exists at a point nearest to the rear side among points that are distant by the detection distance Dx from the right-front lateral sonar 2R within the detection range Afr. The circular arc Rx of short broken line indicates a point distant by the detection distance Dx from the right-front lateral sonar 2R within the detection range Afr. Furthermore, alternatively, the travel enabled distance Dc may be designated on assumption that the detection point Px exists at the point farthest in the heading direction within the points distant by the detection distance Dx from the right-front lateral sonar 2R within the detection range Afr.

The present embodiment prepares the correspondence relation data through the various experiments. The travel enabled distance Dc defined in the correspondence relation data is thus assumed to be a value considering the dispersion of the position where the detection point Px actually exists in the detection range Af. The operation of the diagnosis test section F5 will be described in the explanation for the flowchart in FIG. 5.

Figure 5:
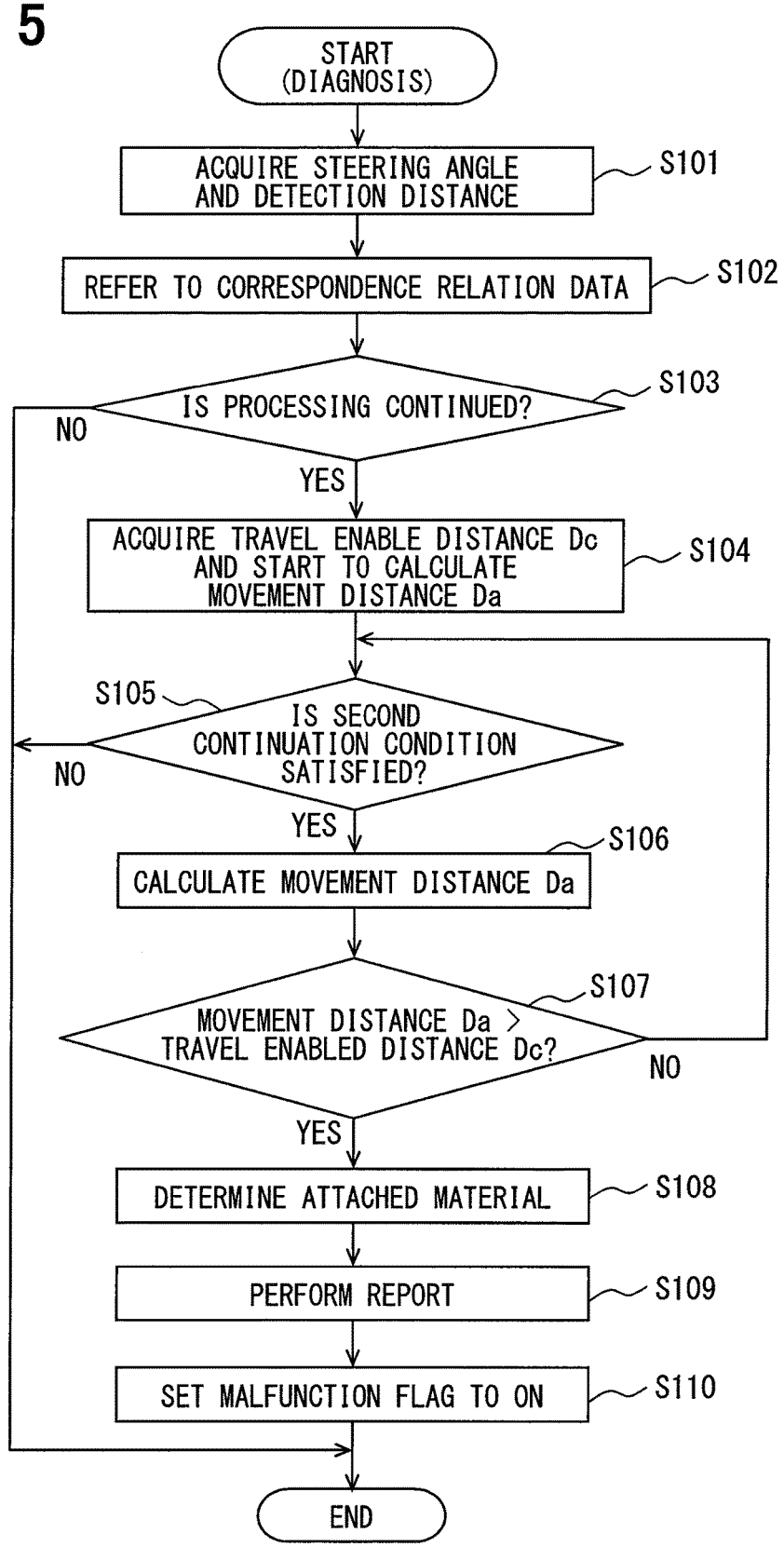
FIG. 5 is a flowchart for explaining a diagnosis related process executed by a diagnosis apparatus.

The following explains a diagnosis related process executed by the diagnosis apparatus 1 (i.e., electronic control unit) using the flowchart in FIG. 5. The diagnosis related process is for diagnosing whether the lateral distance sensor 2 operates normally, in particular, for diagnosing whether a malfunction arises which results from attaching attached material to the lateral distance sensor 2, from the design concept of the correspondence relation data mentioned above in the present embodiment.

The flowchart in FIG. 5 just needs to start successively (e.g., each 100 mm) when the vehicle 10 moves forward at a vehicle speed within an operational vehicle speed region under the state where a malfunction flag is set to OFF. The malfunction flag, which is used for processing, indicates whether the lateral distance sensor 2 operates normally.

When the malfunction flag is set to ON, the diagnosis related process at the previous time or more earlier has determined that the lateral distance sensor 2 malfunctions. In contrast, when the malfunction flag is set to OFF, it is not yet determined that the lateral distance sensor 2 malfunctions. The malfunction flag is set to OFF in the initial state starting when the ignition power is turned on.

Note that the diagnosis related process may be executed independently for each lateral sonar when the lateral distance sensor 2 is provided with a plurality of lateral sonars. That is, in the present embodiment, the diagnosis related process is executed for each of the right-front lateral sonar 2R and the left-front lateral sonar 2L.

It is further noted that a flowchart or processing of the process in the present disclosure includes sections (also referred to as steps), which are represented, for instance, as S101. Further, each section can be divided into several sections while several sections can be combined into a single section. Furthermore, each section can be referred to as a device or module. Further, each section or combined sections can be achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

First, in S101, the travel enabled distance acquisition section F4 accesses the memory 11, reads out the newest (i.e., present) steering angle θ and detection distance Dx, and moves to S102. In S102, the travel enabled distance acquisition section F4 references the correspondence relation data and determines whether the detection distance Dx read in S101 is included in the range of the detection distance defined in the correspondence relation data.

When the present detection distance Dx is equal to or greater than the upper limit for diagnosis, the travel enabled distance Dc necessary for subsequent determinations cannot be acquired and the diagnosis related process cannot be continued. Therefore, when the present detection distance Dx is equal to or greater than the upper limit for diagnosis, S103 results in "NO," ending the present flowchart. At this time, the malfunction flag is maintained to be OFF.

In addition, when it is determined in S102 that the present detection distance Dx is included in the range of the detection distance defined in the correspondence relation data, the lower limit steering angle θth corresponding to the present detection distance Dx is read. The lower limit steering angle θth corresponding to the present detection distance Dx is a lower limit steering angle θth corresponding to the detection distance segment to which the present detection distance Dx belongs. For example, when the present detection distance is 52 cm, the detection distance segment ranging equal to or greater than 50 cm and less than 55 cm is a detection distance segment to which the present detection distance Dx belongs while the lower limit steering angle θth is found to be θ2.

In contrast, when the present steering angle θ is less than the lower limit steering angle θth, S103 results in "NO," ending the present flowchart. The case when the present steering angle θ is less than the lower limit steering angle θth signifies that there is no possibility that the vehicle 10 travels the detection point Px.

In contrast, when the present steering angle θ is equal to or greater than the lower limit steering angle θth, S103 results in "YES" and the processing moves to S104. The case when the present steering angle θ is equal to or greater than the lower limit steering angle θth signifies that there is a possibility that the vehicle 10 travels the detection point Px.

That is, suppose a case that S103 results in "YES" and the processing moves to S104. This case corresponds to a case where the present detection distance Dx is less than the upper limit for diagnosis, and, simultaneously, the present steering angle θ is equal to or greater than the lower limit steering angle θth corresponding to the present detection distance Dx. The condition that S103 results in "YES" and the processing moves to S104 is defined as a first continuation condition. The determination that the first continuation conditions is satisfied corresponds to the determination that the vehicle 10 has a possibility of making contact with an object detected by the lateral distance sensor 2.

In S104, the diagnosis test section F5 reads the travel enabled distance DC corresponding to the present detection distance Dx while requiring the movement distance calculation section F2 to calculate successively the movement distance Da from the present time. The travel enabled distance Dc corresponding to the present detection distance Dx is a travel enabled distance Dc corresponding to the detection distance segment to which the present detection distance Dx belongs. When S104 is completed, the processing moves to S105. The flowchart from S105 to S107 is repeatedly executed until the following conditions are satisfied.

First, in S105, the diagnosis test section F5 determines whether a predetermined second continuation condition is satisfied. The second continuation condition is a condition for continuing the diagnosis related process using the travel enabled distance Dc and the lower limit steering angle θth obtained by the travel enabled distance acquisition section F4 in S102.

Here, the determination that the second continuation condition is satisfied is made when the present detection distance Dx belongs to the same detection distance segment as that of the detection distance Dx at the time of starting the present flowchart in the correspondence relation data, and, simultaneously, the state is maintained where the present steering angle θ is equal to or greater than the lower limit steering angle θth. That is, the determination that the second continuation condition is not satisfied is made when the present steering angle θ is less than the lower limit steering angle θth, or when the detection distance Dx varies significantly and departs from the above-mentioned detection distance segment.

As another embodiment, the determination that the second continuation condition is satisfied may be made when the present detection distance Dx belongs to the same detection distance segment as the detection distance segment of the detection distance Dx at the time of starting the present flowchart in the correspondence relation data, or when the present detection distance Dx belongs to a detection distance segment having a distance shorter than that of the detection distance segment of the detection distance Dx at the time of starting the present flowchart in the correspondence relation data. Note that even such cases, when the steering angle θ is less than the lower limit steering angle θth, the determination that the second continuation condition is not satisfied.

When the second continuation condition is satisfied, S105 results in "YES" and the processing moves to S106. When the second continuation condition is not satisfied, S105 results in "NO," ending the present flowchart. At this time, the malfunction flag is maintained to be OFF.

In S106, the diagnosis test section F5 acquires the movement distance Da that the movement distance calculation section F2 calculates successively since executing S104, and moves to S107. The processing from S101 to S103 is assumed to be executed in a very short time, and the time of starting the calculation of the movement distance Da is set to S104. However, the time of starting the present flowchart may be set to the time of starting the calculating of the movement distance Da.

In S107, the diagnosis test section F5 determines whether the movement distance Da is greater than the travel enabled distance Dc. When the movement distance Da is greater than the travel enabled distance Dc, S107 results in "YES" and the processing moves to S108. In contrast, when the movement distance Da is not greater than the travel enabled distance Dc, S107 results in "NO" and the processing returns to S105.

When returning to S105 from S107, the processing may wait for a predetermined time since completing S107 (e.g., 100 milliseconds) before executing S105. Here, such standby time may be desirable to be equal or greater than the cycle for the calculation.

Note that S107 of the present embodiment is configured to compare the movement distance Da with the travel enabled distance Dc. However, alternatively, the movement distance Da may be compared with a value obtained by adding a predetermined value (i.e., a margin value) to the travel enabled distance Dc. In such a case, when the movement distance Da is greater than the value obtained by adding the margin value to the travel enabled distance Dc, S107 results in "YES" and the processing moves to S108.

In S108, the diagnosis test section F5 determines that the lateral distance sensor 2 being a target for the diagnosis related process does not operate normally, and the processing moves to S109. In the present embodiment, the determination that the lateral distance sensor 2 being a target for the diagnosis related process does not operate normally signifies that an attached material is attached to a portion of the lateral distance sensor 2 that is exposed outwardly from the vehicle.

In S109, the diagnosis test section F5 instructs the report apparatus 3 to perform a report that the lateral distance sensor 2 malfunctions temporarily, and the processing moves to S110. Such a report to a driver may urge him or her to eliminate the attached material that is attached to the lateral distance sensor 2.

In S110, the diagnosis test section F5 sets the malfunction flag to ON, ending the present flowchart. A preferable example of the present embodiment may have a configuration in which the malfunction flag returns to OFF automatically when a predetermined term of validity elapses since being set to ON. This is because an attached material causing the malfunction may be taken off naturally (or taken off by the user's hand). Taking off the attached material naturally may be due to a vibration or a wind pressure which acts on the vehicle body.

(Summary of Embodiment)

The above configuration is provided as follows. The travel enabled distance acquisition section F4 determines whether the vehicle 10 is estimated to have contact with an object (i.e., detection object) detected by the lateral distance sensor 2, based on a detection distance Dx detected by the lateral distance sensor 2 and a present steering angle θ. When it is determined that the vehicle 10 is estimated to have contact with the detection object (S102: YES), the travel enabled distance Dc corresponding to the detection distance Dx is acquired (S104).

When the movement distance Da of the vehicle 10 is greater than the travel enabled distance Dc under a state where the second continuation condition is satisfied (S107: YES), the diagnosis test section F5 determines that the lateral distance sensor 2 does not operate normally (S108). Furthermore, the report that the lateral distance sensor 2 malfunctions is issued to the driver (S109).

The above configuration can detect the lateral distance sensor 2 malfunctioning and issue a report that the lateral distance sensor 2 malfunctions to the driver. In particular, the present embodiment defines the upper limit for diagnosis as a value according to the distribution of the detection distance outputted when the lateral distance sensor 2 malfunctions due to an attached material attached to the lateral distance sensor 2.

Under such configuration, the determination of the lateral distance sensor 2 malfunctioning from the diagnosis related process indicates a high possibility that the lateral distance sensor 2 malfunctions temporarily due to an attached material. Therefore, when it is determined that the lateral distance sensor 2 malfunctions, a report can be issued which indicates a possibility that the lateral distance sensor 2 malfunctions temporarily due to an attached material. This permits the driver to take a measure such as once stopping the vehicle to eliminate an attached material.

Malfunctioning of the lateral distance sensor 2 arises from several causes in general. If the cause of malfunction is a defect of a circuit, it is difficult for drivers to repair it immediately by themselves. In contrast, if the cause of malfunction is an attached material, it is possible for drivers to remove the attached material to restore it to a normal operation. That is, if drivers recognize that the cause of malfunction is an attached material, they can restore the lateral distance sensor 2 to a normal state comparatively simply.

The convenience for drivers can be thus improved by not only issuing a report that the lateral distance sensor 2 malfunctions, but also issuing a report that the cause of malfunction is estimated to be an attached material.

Further, when the diagnosis test section F5 determines that the lateral distance sensor 2 malfunctions, the detection process with the lateral distance sensor 2 may be stopped temporarily.

The embodiment of the present disclosure is described in the above; however, the present disclosure is not limited to the above embodiment. The following embodiment is also included in the technical scope of the present disclosure; furthermore, another embodiment or modification other than the following is also included in the technical scope of the present disclosure as long as not deviating from the technical subject matter.

<First Modification>

The above embodiment explains a configuration as follows. The correspondence relation data illustrates a correspondence relation among the detection distance Dx, the lower limit steering angle θth, and the travel enabled distance Dc, as in FIG. 3. The travel enabled distance acquisition section F4 acquires the travel enabled distance Dc according to the present detection distance Dx.

Note that in a greater case that the steering angle θ is greater than the lower limit steering angle θth, the vehicle approaches a detection point Px more steeply than in an equal case that the steering angle θ is equal to the lower limit steering angle θth. The travel enabled distance Dc in the greater case is shorter than that in the equal case. The travel enabled distance Dc used in the above-mentioned embodiment is a value, which is determined according to the lower limit steering angle θth and thus indicated to be excessively long in the case that the steering angle θ is greater than the lower limit steering angle θth.

If being determined according to the present steering angle θ instead of the lower limit steering angle θth, the travel enabled distance Dc is indicated to match with a distance that is to be actually traveled. That is, a shorter movement distance Da allows the determination whether the lateral distance sensor 2 malfunctions.

Such a configuration (first modification) provides a correspondence relation data illustrated in FIG. 6. As in FIG. 6, the correspondence relation data in the first modification is data defining a detection distance Dx and a travel enabled distance Dc according to the steering angle θ being inputted. More specifically, with respect to each of several detection distance segments, several travel enabled distance Dc are defined as being different from each other depending on corresponding steering angles. Note that several segments (i.e., steering angle segments) are provided by dividing the range of the steering angle θ to be possibly inputted by five-degree intervals so as to define the travel enabled distance Dc with respect to each combination of the respective steering angle segments and the respective detection distance segments. Note that the travel enabled distance Dc may be set through experiments with respect to each combination of the respective steering angle segments and the respective detection distance segments.

The width of each steering angle segment need not be limited to five degrees, but be smaller (e.g., one degree) or greater (e.g., ten degrees). The width of each detection distance segment may be set as needed similarly. Further, with respect to some detection distance segment, the travel enabled distance Dc cannot be defined for the steering angle segment smaller than the lower limit steering angle; such effect may be indicated by inserting a value (e.g., a maximum value).

The travel enabled distance acquisition section F4 in the first modification specifies the present detection distance Dx and the travel enabled distance Dc according to the steering angle θ by referring to the correspondence relation data. For example, when the detection distance Dx is 37 cm and the steering angle θ is 25 degrees, the travel enabled distance Dc is indicated to be Dc22.

Note that the first modification allows the determination that the lateral distance sensor 2 malfunctions when the movement distance Da becomes greater than the travel enabled distance Dc under the continued state where the steering angle θ is maintained to be a value within the steering angle segment to which the steering angle θ at the time of acquiring the travel enabled distance Dc belongs, and, simultaneously, the detection distance Dx is maintained to be a value within the detection distance segment to which the detection distance Dx at the time of acquiring the travel enabled distance Dc belongs.

The configuration of the first modification allows the travel enabled distance acquisition section F4 to acquire a more suitable travel enabled distance Dc, enhancing the accuracy of diagnosis. Although the correspondence relation data is indicated as a table format as in FIG. 6, it may be indicated differently. The correspondence relation data in the first modification, which only need to determine the travel enabled distance Dc uniquely depending on the present detection distance Dx and the steering angle θ being presently inputted, may be indicated as a map or as a function having variables of the detection distance Dx and the steering angle θ.

<Second Modification>

The first modification explains an example where the correspondence relation data is prepared for specifying the travel enabled distance Dc from the detection distance Dx and the steering angle θ and the travel enabled distance acquisition section F4 acquires the travel enabled distance Dc by referring to the data. There is no need to be limited thereto.

The travel enabled distance acquisition section F4 may calculate the travel enabled distance Dc based on the present detection distance Dx and the steering angle θ. For example, the travel enabled distance acquisition section F4 calculates a movement locus of the reference point Pc of the vehicle 10 from the present steering angle θ, and, furthermore, calculates a movement locus of a boundary portion of the area where the vehicle 10 exists in a horizontal plane using body shape information.

The travel enabled distance acquisition section F4 may then define a distance, which is traveled by the reference point Pc until the boundary portion of the vehicle 10 and the detection point Px, as the travel enabled distance Dc. The method of determining the relative position of the detection point Px to the vehicle 10 at the time of calculating the travel enabled distance Dc may be a well-known method.

Further the second modification may determine that the lateral distance sensor 2 malfunctions when the movement distance Da becomes greater than the travel enabled distance Dc under a continued state where the steering angle θ is maintained to be a value within a predetermined range (e.g., ±5 degrees) from the steering angle θ at the time of acquiring the travel enabled distance Dc, and, simultaneously, the detection distance Dx is maintained to be a value within a predetermined range (e.g., ±5 cm) from the detection distance Dx at the time of acquiring the travel enabled distance Dc.

Further, the travel enabled distance acquisition section F4 in the second modification may be exemplified such that when the detection distance Dx becomes less than the upper limit for diagnosis mentioned above, the travel enabled distance Dc may be calculated. Such an example provides an advantageous effect similar to that of the above-mentioned embodiment while reducing a calculation load. In addition, the travel enabled distance acquisition section F4 may be exemplified as calculating the travel enabled distance Dc when the steering angle θ becomes equal to or greater than a constant angle (e.g., 20 degrees).

<Third Modification>

The above explains examples that adopt the right-front lateral sonar 2R and left-front lateral sonar 2L as the lateral distance sensor 2. There is no need to be limited thereto. The lateral distance sensor 2 may be a right-rear lateral sonar and a left-rear lateral sonar, which are arranged respectively at a right side face and a left side face of a rear bumper of the vehicle 10.

The right-rear lateral sonar may be installed in a right side face of the rear bumper to have a position such that a center line of directionality is parallel with an axle direction of the vehicle 10. The left-right lateral sonar may be installed in a left side face of the rear bumper to have a position such that a center line of directionality is parallel with an axle direction of the vehicle 10. Transmitting search waves towards a lateral region relative to the vehicle 10 allows formation of a predetermined detection range from the installed position to a rear lateral region relative to the vehicle 10.

Further, the central line in the directionality of a right (or left) lateral sonar may extend to incline rearward up to about 40 degrees with respect to the axle direction of the vehicle 10. In this case, the right (or left) lateral sonar transmits search waves diagonally rearward of the vehicle 10.

Further, the diagnosis apparatus 1 may use the right (or left) rear lateral sonar as a target of the diagnosis related process when the vehicle 10 is driven backward. Whether the vehicle 10 is driven forward or backward may be determined based on a detection result of the shift position sensor contained in vehicle information. For example, when the shift position is a position permitting a driving power to transmit in a direction in which the vehicle 10 is driven forward, the vehicle 10 is determined to be driven forward. In contrast, when the shift position is a position permitting a driving power to transmit in a direction in which the vehicle 10 is driven backward, the vehicle 10 is determined to be driven backward.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A lateral distance sensor diagnosis apparatus cooperating with a lateral distance sensor that detects a distance with an object existing in a lateral region relative to a vehicle by transmitting search waves towards the lateral region and receiving reflected waves reflected by the object in a propagation range of the search waves, the lateral distance sensor diagnosis apparatus comprising:
a detection result acquisition section that acquires a detection distance that is a distance detected by the lateral distance sensor;
a vehicle information acquisition section that acquires vehicle information that is information indicating a travel state of the vehicle, the vehicle information including a steering angle;
a travel enabled distance acquisition section that determines whether the vehicle is estimated to have contact with the object detected by the lateral distance sensor because of a turning radius difference between tracks followed by front and rear inner wheels when turning based on the detection distance acquired by the detection result acquisition section and the steering angle included in the vehicle information, the travel enabled distance acquisition section acquiring, based on the detection distance, a travel enabled distance when determining that the vehicle is estimated to have contact with the object, the travel enabled distance being a distance the vehicle is permitted to travel before the vehicle has contact with the object;
a movement distance calculation section that calculates a movement distance of the vehicle from when the detection result acquisition section acquires the detection distance that the travel enabled distance acquisition section uses to acquire the travel enabled distance; and
a diagnosis test section that determines whether the lateral distance sensor operates normally by comparing, when the travel enabled distance acquisition section determines that the vehicle is estimated to have contact with the object, the movement distance calculated by the movement distance calculation section with the travel enabled distance acquired by the travel enabled distance acquisition section,
wherein the diagnosis test section determines that the lateral distance sensor fails to operate normally when the movement distance becomes greater than the travel enabled distance under a state being maintained, the state where the steering angle accords with an angle at which the vehicle will have contact with the object.

2. The lateral distance sensor diagnosis apparatus according to claim 1, wherein
the travel enabled distance acquisition section performs determining whether the vehicle is estimated to have contact with the object when the detection distance is less than a predetermined upper limit that is used in diagnosis, and acquires the travel enabled distance when determining that the vehicle is estimated to have contact with the object.

3. The lateral distance sensor diagnosis apparatus according to claim 2, wherein:
the travel enabled distance acquisition section performs determining whether the vehicle is estimated to have contact with the object when the detection distance is less than the upper limit used in diagnosis, and, simultaneously, the steering angle is equal to or greater than a predetermined lower limit steering angle;
the travel enabled distance acquisition section acquires the travel enabled distance when determining that the vehicle is estimated to have contact with the object; and
the diagnosis test section determines that the lateral distance sensor fails to operate normally when the movement distance becomes greater than the travel enabled distance under a state being maintained, the state where the detection distance is less than the upper limit used in diagnosis, and, simultaneously, the steering angle is equal to or greater than the lower limit steering angle.

4. The lateral distance sensor diagnosis apparatus according to claim 2, wherein
the upper limit used in diagnosis corresponds to a distance detected when an attached material is attached to the lateral distance sensor.

5. The lateral distance sensor diagnosis apparatus according to claim 4, wherein
when determining that the lateral distance sensor fails to operate normally, the diagnosis test section notifies a driver that an attached material attached to the lateral distance sensor is estimated to cause a false operation.

6. The lateral distance sensor diagnosis apparatus according to claim 1, wherein
the upper limit used in diagnosis is set to be less than an estimated value of a gap between the vehicle and a different vehicle traveling parallel with the vehicle, the gap being in a vehicle width direction.

7. The lateral distance sensor diagnosis apparatus according to claim 1, wherein:
the travel enabled distance acquired by the travel enabled distance acquisition section is determined according to the detection distance and the steering angle; and
the diagnosis test section determines that the lateral distance sensor fails to operate normally when the movement distance becomes greater than the travel enabled distance under a state being maintained, the state where the steering angle is within a predetermined range from an angle when the travel enabled distance is acquired.

8. The lateral distance sensor diagnosis apparatus according to claim 1, wherein
when determining that the lateral distance sensor fails to operate normally, the diagnosis test section notifies a driver that the lateral distance sensor fails to operate normally.

* * * * *